United States Patent [19]
Monteith

[11] Patent Number: 5,753,115
[45] Date of Patent: May 19, 1998

[54] SUBMERGED PIPE SEPARATOR TANK

[75] Inventor: Joseph Gordon Monteith, Mississauga, Canada

[73] Assignee: Stormceptor Corporation, Rockville, Md.

[21] Appl. No.: 677,419

[22] Filed: Jul. 9, 1996

[51] Int. Cl.⁶ ............................................. B01D 21/02
[52] U.S. Cl. .................... 210/170; 210/521; 210/532.1; 210/538
[58] Field of Search ................................. 210/154, 170, 210/254, 521, 532.1, 538, 540

[56] References Cited

U.S. PATENT DOCUMENTS

| | | | |
|---|---|---|---|
| 942,907 | 12/1909 | Huff . | |
| 1,844,443 | 2/1932 | Schmidt . | |
| 3,221,881 | 12/1965 | Weiler et al. | 210/136 |
| 3,282,436 | 11/1966 | Malm | 210/532.1 |
| 3,374,894 | 3/1968 | Webster | 210/532.1 |
| 3,567,024 | 3/1971 | McCormick | 210/170 |
| 3,862,040 | 1/1975 | Preus et al. | 210/254 |
| 4,136,010 | 1/1979 | Pilie et al. | 210/164 |
| 4,985,148 | 1/1991 | Monteith | 210/532.1 |
| 5,498,331 | 3/1996 | Monteith | 210/170 |
| 5,549,817 | 8/1996 | Horsley et al. | 210/540 |

*Primary Examiner*—Christopher Upton
*Attorney, Agent, or Firm*—Shoemaker and Mattare Ltd.

[57] ABSTRACT

A tank interceptor for rainwater and waste-water has an approximately opposed inlet and outlet. An inlet compartment is disposed adjacent the inlet, while an outlet compartment is provided in communication with the outlet. Both compartments are upwardly open, thus constituting a first aperture adjacent the top of the compartment. A second aperture is provided in each compartment, adjacent the bottom, through which solid and other heavy components can pass into the internal chamber of the container. The first compartment has an auxiliary outlet below the first aperture but above the second aperture, the auxiliary outlet communicating with the top of an auxiliary conduit that has an open bottom end in communication with the internal chamber of the container at a location adjacently below the level of liquid in the internal chamber at low entry flow rates. The auxiliary outlet being adapted to allow oil-based materials to be drawn off.

3 Claims, 4 Drawing Sheets

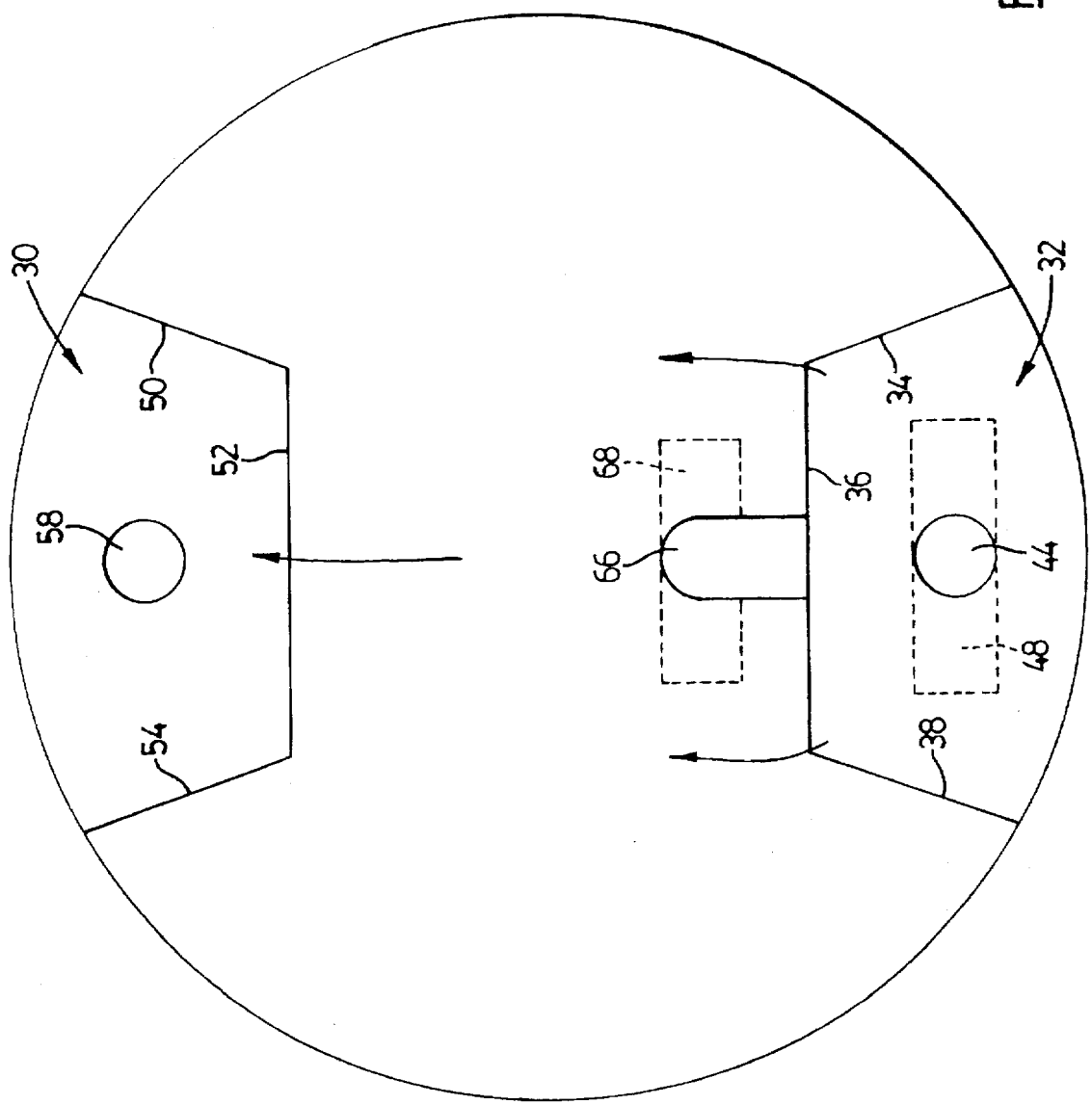

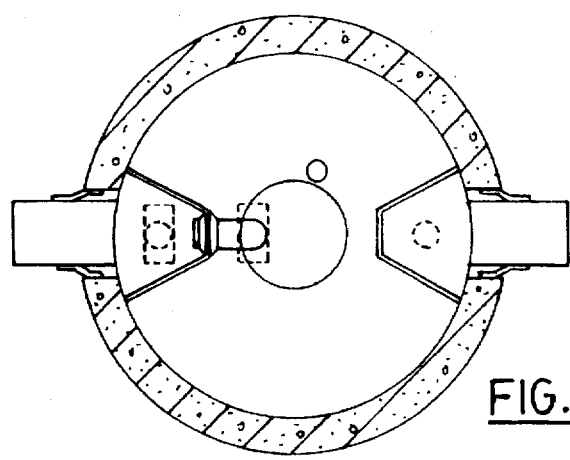
FIG. 6
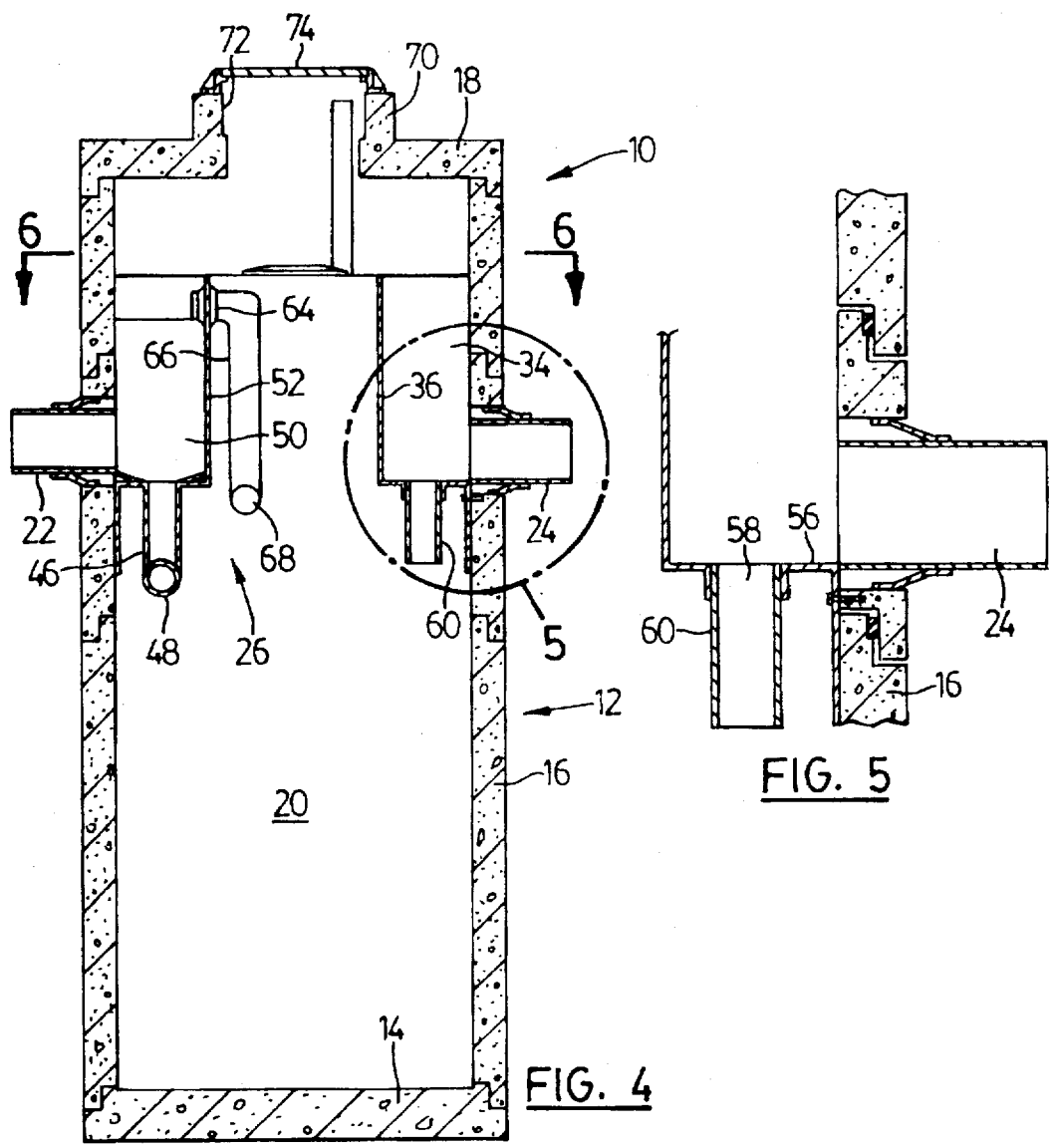
FIG. 5
FIG. 4

SUBMERGED PIPE SEPARATOR TANK

This invention relates generally to separator tanks, sometimes called interceptors, adapted to receive primarily rainwater from a storm sewer or drain, and additionally to perform the function of separating and entrapping any oil- or gasoline-based materials and suspended solids that may enter, allowing the water fraction to discharge into municipal receiving sewers. Prior art devices of this kind are typically equipped with various baffles and chambers operating in such a way as to collect specific components of the waste fluid and separate them from others.

In this connection, reference may be had to U.S. Pat. No. 4,136,010, issued Jan. 23, 1979 to Pilie et al.

Other patents, only peripherally related to the subject matter of this specification, are as follows:
U.S. Pat. No. 1,844,443, Schmidt, Feb. 9, 1932;
U.S. Pat. No. 942,907, Huff, Dec. 14, 1909;
U.S. Pat. No. 3,567,024, McCormick, Mar. 2, 1971;
U.S. Pat. No. 3,221,881 Weiler et al, Dec. 7, 1965.

PRIOR ART

An improved construction is the subject of my U.S. Pat. No. 4,985,148, issued Jan. 15, 1991, and entitled, "Improved Separator Tank Construction". The purpose of the tank interceptor set forth in the latter patent is to provide two distinct responses to two different operating conditions:

(1) When the materials entering the interceptor include discharge from a service station, garage, machine shop, factory or the like, or oil that has spilled accidentally, these non-aqueous materials are collected within the interceptor. The aqueous fraction is allowed to leave the interceptor and pass on to a storm sewer or the like, but the liquid fraction made up of oil or fat of animal, vegetable or mineral origin, gasoline and the like remains trapped within the interceptor until the same is pumped out. Further, any heavier-than-water materials sink to the bottom of the interceptor and are confined to a particular location from where they can also be pumped out at intervals.

(2) The interceptor of the prior invention is also adapted to deal with inflow resulting from heavy rain during a storm. Such inflow would typically be a combination of storm drainage from an adjacent industrial property, garage or the like, as well as inflow from storm drains adapted to catch rainwater. When a large quantity of rainwater arrives at the interceptor of the prior invention, the interceptor automatically diverts most of this flow directly to an outlet opening which passes it directly to a storm sewer. Only a portion of the flow of the incoming rainwater is allowed through the treatment/storage chamber of the interceptor.

To accomplish the aforesaid goals, my prior art separator provides, within the tank-like interceptor, a passageway extending substantially directly between the inlet and the outlet. The passageway is essentially sealed from communication with the remainder of the interior of the tank interceptor, except for an opening adjacent the inlet and an opening adjacent the outlet. Each opening communicates the passageway with the remainder of the tank interior, which may be regarded as a treatment chamber. Finally, a weir means is provided within the passageway, disposed with respect to the first opening such that, under relatively low entry flow rates, all entering materials are contained by the weir and flow through the first opening and into the treatment chamber, whereas under relatively high entry flow rates, part of the entering material overflows the weir and is delivered by the passageway to the outlet.

Recognizing that it was not necessary for the entire volume inside the interceptor tank (except for the passageway means) to be used as a treatment chamber, and in view of the desirability of making the means providing the high-flow passageway more fully accessible to personnel wishing to inspect the installation for damage, improper accumulations of materials, etc., I developed an improved version of the separator tank construction, in which a treatment compartment was provided in the bottom portion thereof and a by-pass compartment in the top portion thereof (the latter being a convenient area where inspection personnel may stand). The improved version just mentioned is the subject of U.S. Pat. No. 5,498,331, issued Mar. 12, 1996.

More particularly, the improved version provides a tank interceptor for rainwater and waste-water, including a container having a bottom wall, a side wall and a top wall which together define an internal chamber, a partition dividing the chamber into a by-pass compartment above the partition and a treatment compartment below the partition, the partition having an upper surface, a main inlet through the side wall above the partition, adapted to permit liquid to flow into the by-pass compartment, an outlet adjacently above the upper surface and spaced away from the inlet, the outlet being adapted to permit liquid to flow out of the by-pass compartment. The upper surface of the partition is configured to include a raised portion which isolates the inlet from the outlet, the raised portion constituting a weir, such that liquid entering at the inlet and seeking to reach the outlet through the by-pass compartment must overflow the weir in order to do so. The partition has first and second openings on opposite sides of the raised portion of the upper surface of the partition, both openings communicating the by-pass compartment with the treatment compartment, and allowing liquid, without having to overflow the raised portion, to travel from the inlet to the outlet by passing through the treatment compartment. Each of the first and second openings communicates with the top of a respective vertical pipe, each pipe having a bottom end communicating with the treatment compartment.

Because it is necessary to allow personnel to inspect, clear and/or repair portions of the treatment compartment below the partition, the container of U.S. Pat. No. 5,498,331 is provided with an inspection opening in the partition, large enough to allow maintenance personnel to pass through, along with a man-hole cover adapted to close the inspection opening in a liquid-tight manner.

I then realized that the position of the inspection opening just mentioned (closable by a man-hole cover) represented an unnecessary complexity, and that it could be dispensed with by making one of the openings through the partition (the openings connected to the respective pipes) large enough to allow maintenance personnel to pass through and into the treatment compartment. I further realize that the access opening at the top of the container (allowing access to the by-pass compartment) could be positioned in alignment with a large-diameter partition opening, to allow visual inspection and sampling from outside the container, and to facilitate the entry of a snorkel for the purpose of pumping out the contents of the treatment compartment. Accordingly, a further patent application was prepared and filed under Ser. No. 337,393, dated Nov. 8, 1994 (now issued under Ser. No. 5,498,331), which is directed to a tank interceptor for rain water and waste-water, including a container divided by a partition into an upper by-pass compartment and a lower treatment compartment. An inlet and outlet for the container are located in the side wall adjacently above the partition. The partition defines a raised weir which constrains liquids entering at low flow rates to pass downwardly through an adjacent opening through the partition, to collect in the treatment compartment below the partition. A second opening through the partition is located adjacent the outlet, and pipes are associated with both openings. One of the openings is made large enough to allow passage of maintenance personnel, thus obviating the need for a further access opening and a liquid-tight seal for that further opening. An access opening at the top of the container is generally aligned with the large-diameter opening through the partition, thus allowing inspection, sampling and pumping out, without requiring maintenance personnel to enter the container.

I have now devised a further improvement in the design, which nonetheless has the capability of routing all slowly-flowing materials downwardly into a treatment zone, without requiring any partition to establish the limits of such zone, and at the same time to provide for liquid spill-over in the event of a heavy rain storm, so that a heavy flow can be routed directly from the inlet to the outlet.

GENERAL DESCRIPTION OF THIS INVENTION

More particularly, this invention provides a tank interceptor for rainwater and waste-water, comprising:

a container including a bottom wall, a side wall and a top wall, said walls defining an internal chamber, an inlet which opens through the side wall at an intermediate location between the top and bottom walls, an outlet which opens through the side wall at a position which is circumferentially spaced away from the inlet, but is at substantially the same location between the top and bottom walls, first partition means within the chamber adjacent the inlet, said first partition means defining an inlet compartment communicating directly with said inlet, second partition means within the chamber adjacent the outlet, said second partition means defining an outlet compartment communicating directly with said outlet, each compartment having a first aperture means adjacent the top thereof, through which the compartment communicates with the remainder of said internal chamber, each compartment having a second aperture means adjacent the bottom thereof, through which solids and other heavy components in the compartment can pass gravitationally into the internal chamber of the container, and an auxiliary outlet in said first partition means, the auxiliary outlet being located below the respective first aperture means and communicating with the top of an auxiliary conduit which has an open bottom end in communication with the internal chamber of the container at a location adjacently below the level of the liquid in said internal chamber at low entry flow rates, whereby oils and other floating contaminants in the inlet compartment can be drawn off and deposited at substantially the upper surface of the liquid in said internal chamber.

GENERAL DESCRIPTION OF THE DRAWINGS

One embodiment of this invention is illustrated in the accompanying drawings, in which like numerals denote like parts throughout the several views, and in which:

FIG. 3 is a top plan view of the insert of FIG. 1;

FIG. 4 is a vertical axial sectional view of a container with the insert of FIG. 1 in place;

FIG. 5 is an enlargement of a portion of FIG. 4 around which a circular outline is drawn; and FIG. 6 is a cross-sectional view of the container seen in FIG. 4, taken at the line 6—6 of FIG. 4.

DETAILED DESCRIPTION OF THE DRAWINGS

Figure 1:
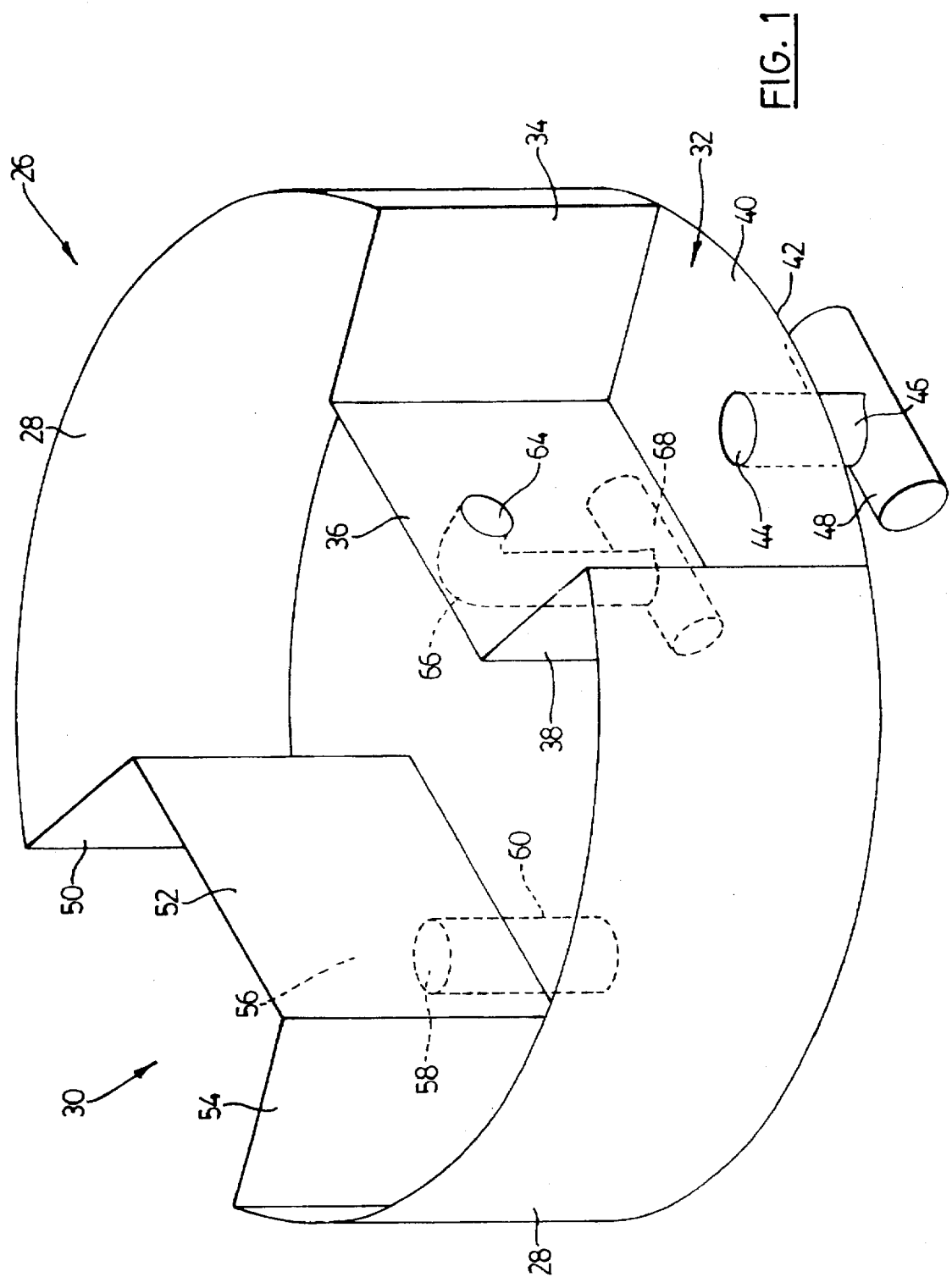
FIG. 1 is a schematic perspective view of an insert adapted for installation within a cylindrical container.
Figure 2:
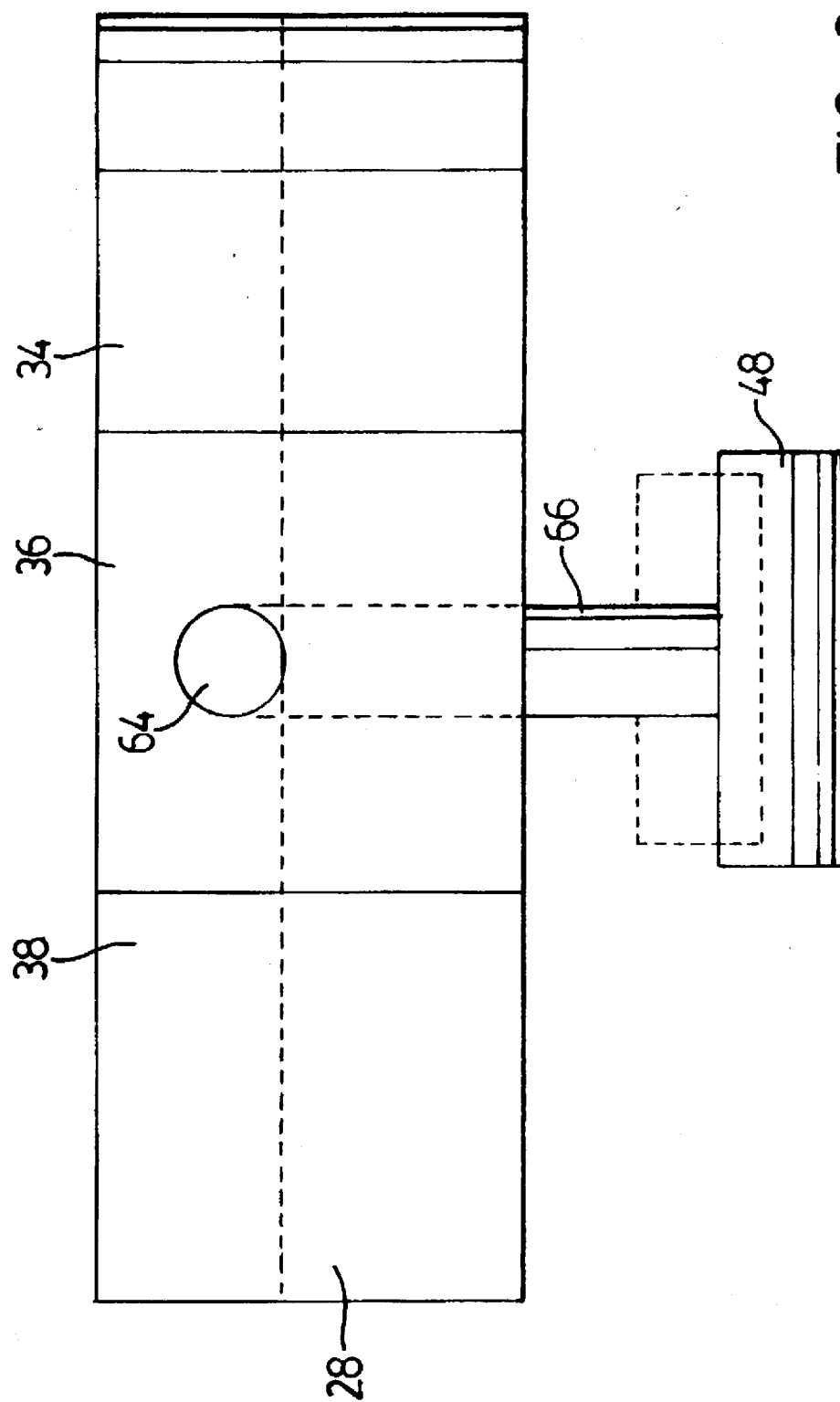
FIG. 2 is an elevational view of the insert of FIG. 1.

Attention is first directed to FIG. 4, which is an axial, sectional view through a tank interceptor 10 for rain water and waste-water, constituted by a container 12 including a bottom wall 14, a side wall 16 and a top wall 18. The walls 14, 16 and 18 together define an internal chamber 20. In the particular embodiment illustrated, the side wall 16 is cylindrical, and both the bottom wall 14 and top wall 18 are circular. The particular shape of the container is not critical however, as will be obvious from what follows.

The container 12 has an inlet 22 opening through the side wall 16 at an intermediate location between the top and bottom walls 18, 14. The container 12 further includes an outlet 24 which opens through the side wall 16 at a position which is circumferentially spaced away from the inlet 22, but is at substantially the same location between the top and bottom walls 18, 14. In the particular embodiment illustrated, the inlet 22 and outlet 24 are diametrically opposed with respect to the cylindrical side wall 16, although it will be appreciated from what follows that strict diametrical positioning is not critical.

Attention is now directed to FIG. 1, which shows in perspective, and somewhat schematically, an insert 26 which is adapted to fit snugly within the container 12 in alignment with the inlet 22 and outlet 24. As best seen in FIG. 1, the insert has a cylindrical side wall 28 which is interrupted at diametrically opposed locations by first and second gaps 30 and 32, at each of which there is provided partition means defining a compartment communicating directly with the inlet or outlet, as the case may be.

More particularly, the insert 26 includes, adjacently gap 32, three vertical rectangular panels 34, 36 and 38 which are disposed in a trapezoidal formation as clearly seen in FIG. 3. In the embodiment illustrated, the panels 34, 36 and 38 and the cylindrical side wall 28 all have the same vertical depth.

The insert 26 further provides, connecting the bottom edges of the panels 34, 36 and 38, a horizontal lower panel 40 which has an arcuate outer edge 42 adapted to abut the inside of the side wall 16 of the main container.

The compartment defined and enclosed by the panels 34, 36 and 38, cooperating with the side wall 16 of the container 12, has an opening 44 through which it communicates with the top of a downwardly projecting pipe 46 having a bottom end in communication with the internal chamber 20 (see FIG. 4), by way of a horizontal T-fitting 48.

Adjacent the other gap 30, the insert 26 provides a substantially identical compartment, including panels 50, 52 and 54 which, together with a lower panel 56, define a compartment in communication with the outlet 24 (not illustrated in FIG. 1). The lower panel 56 has a central opening 58 which is the upper end of a substantially vertical pipe 60 which does not include a T-fitting at the bottom.

Because each compartment is defined by rectangular panels which terminate at an upper edge without any covering or lid for the compartment, the plane containing the upper edges of the panels can be regarded as a first aperture, positioned at the top of the compartment, through which the compartment communicates with the remainder of the internal chamber defined within the tank interceptor 10.

The already-described openings 44 and 58 (communicating with the drop pipes 46 and 60) may be regarded as a second aperture in each case.

As best illustrated in FIGS. 1 and 4, there is provided an auxiliary outlet 64 in the panel 36 which partly defines the inlet compartment. The auxiliary outlet 64 communicates with an oil draw-off pipe 66 which has an open T-fitting 68 at the bottom, at a location adjacently below the level of liquid in the internal chamber 20 at low entry flow rates (which will be explained in greater detail below).

To provide a more complete understanding of the operation of the insert 26, two conditions will be assumed: in the first condition, liquid containing water and certain contaminants is flowing at a low flow rate through the inlet 22 and into the tank interceptor. It is assumed that some of the contaminants or pollutants are oil-based, and therefore will float at the upper surface of the water phase. At such low flow rate, the entering liquid flows to the opening 44 and down the sediment drop pipe 46, entering the internal chamber 20 at both ends of the T-fitting 48. Any sediments which are heavier than water will drop to the bottom of the chamber 20, while any components which are oil or gasoline based will float on top of the water as it builds up in the internal chamber 20.

As liquid continues to enter the tank interceptor through the inlet 22, the liquid level in the internal chamber 20 rises until it reaches a level roughly even with the bottoms of the inlet and outlet 22 and 24. When this occurs, the aqueous phase (now largely separated from contaminants, sediments and oil-base materials) will rise up along the pipe 60 and flow out through the outlet.

It is now assumed that a far greater flow of liquid reaches the inlet 22, as a result of a local downpour. In this condition, the pipe 46 is not large enough to permit all of the entering liquid to flow down and then out the ends of the T-fitting 48. While a small fraction of the inflow will pass down along the pipe 46, the greater amount will start to fill up the inlet compartment, continuing to rise until it reaches the auxiliary outlet 64. We assume that a small charge of floatable materials (oil, etc.) rises to lie at the top of the liquid in the inlet compartment, and thus is the first component to reach the auxiliary outlet 64. Such oils (along with a certain quantity of water, of course) will then leave the inlet compartment through the auxiliary opening 64, and flow down the oil draw-off pipe 66 to the T-fitting 68, where they will be dispersed into the liquid contained in the internal chamber 20. If the inrush of liquid through the inlet 22 is greater than can be handled by the openings 44 and 64, then the liquid level and the inlet compartment will continue to rise, up to the upper opening (constituted by the open top of the compartment), where it will spill over and collect at the bottom of the internal chamber 20. With a continued influx of liquid through the inlet 22, the level of the liquid within the internal chamber 20 will rise up to the top of the outlet compartment, where it will spill over the panels 50, 52 and 54, thus entering the outlet compartment, from where it can leave the tank interceptor 10 through the outlet 24.

Centrally located in the top wall 18 of the container 12 is an upwardly projecting annulus 70 surrounding an entry opening 72 through which maintenance personnel can enter the internal chamber if required. A standard seal or man-hole cover 74 is provided for closing the opening 72.

It will be seen particularly in FIG. 4 that the position of the T-fitting 68 at the bottom of the auxiliary oil draw-off pipe 66 places it adjacently below the level of the liquid in the internal chamber 20 under low-flow conditions (the upper surface of the liquid lying approximately even with the bottoms of the inlet and outlet 22 and 24).

The T-fitting 68 breaks up any rush of liquid flowing down the oil draw-off pipe 66, so as to avoid any disruption or "scouring" effect that might mix previously-collected oil-based floating materials with the aqueous phase, and then eject them from the container 12 through the outlet 24. The T-fitting 48 at the bottom of the pipe 46 has a similar function.

If desired, the insert 26 (see FIG. 1) can have a bottom "skirt" extension projecting downwardly in cylindrical alignment with side wall 28. The purpose of a skirt of this kind is to improve the seal of the insert against the inside of the container 12, and to facilitated the securement of the insert 26 in proper position.

While one embodiment of this invention has been illustrated in the accompanying drawings and described hereinabove, it will be evident that changes and modifications may be made therein, without departing from the essence of this invention, as set forth in the appended claims.

The embodiments of the Invention in which an exclusive property or privilege is claimed are defined as follows:

1. A tank interceptor for rainwater and waste-water, comprising:

a container including a bottom wall, a side wall and a top wall, said walls defining an internal chamber, an inlet which opens through the side wall at an intermediate location between the top and bottom walls, an outlet which opens through the side wall at a position which is circumferentially spaced away from the inlet, but is at substantially the same location between the top and bottom walls, first partition means within the chamber adjacent the inlet, said first partition means defining an inlet compartment communicating directly with said inlet, second partition means within the chamber adjacent the outlet, said second partition means defining an outlet compartment communicating directly with said outlet, each compartment having a first aperture means adjacent the top thereof, through which the compartment communicates with the remainder of said internal chamber, each compartment having a second aperture means adjacent the bottom thereof, through which solids and other heavy components in the compartment can pass gravitationally into the internal chamber of the container, and an auxiliary outlet in said first partition means, the auxiliary outlet being located below the respective first aperture means and communicating with the top of an auxiliary conduit which has an open bottom end in communication with the internal chamber of the container at a location adjacently below the level of the liquid in said internal chamber at low entry flow rates, whereby oils and other floating contaminants in the inlet compartment can be drawn off and deposited at substantially the upper surface of the liquid in said internal chamber.

2. The tank interceptor claimed in claim 1, in which each compartment is delimited by a portion of the side wall of the container, cooperating with at least one substantially vertical panel and a lower panel, and in which said first aperture means of each compartment is provided by the upper termination of said at least one vertical panel at a free edge without closing the top of the compartment; the lower panel of each compartment being generally in horizontal alignment with the lowest part of the respective inlet or outlet; said second aperture means of each compartment including an opening in said lower panel communicating with the top of a downwardly projecting pipe of which the bottom communicates with said internal chamber at a level below said open bottom end of the auxiliary conduit.

3. The tank interceptor claimed in claim 2, in which each compartment is delimited by said portion of the side wall and three planar, substantially vertical panels set in an angular relationship which appears trapezoidal when seen in plan view.

* * * * *